(12) United States Patent
Kaeppler et al.

(10) Patent No.: US 11,299,592 B2
(45) Date of Patent: Apr. 12, 2022

(54) METHOD FOR PRODUCING ORGANOPOLYSILOXANE RESINS

(71) Applicant: WACKER CHEMIE AG, Munich (DE)

(72) Inventors: Klaus Kaeppler, Burghausen (DE); Elfriede Thumser, Simbach (DE)

(73) Assignee: WACKER CHEMIE AG, Munich (DE)

(*) Notice: Subject to any disclaimer, the term of this patent is extended or adjusted under 35 U.S.C. 154(b) by 220 days.

(21) Appl. No.: 16/613,955

(22) PCT Filed: May 16, 2017

(86) PCT No.: PCT/EP2017/061662
§ 371 (c)(1),
(2) Date: Nov. 15, 2019

(87) PCT Pub. No.: WO2018/210405
PCT Pub. Date: Nov. 22, 2018

(65) Prior Publication Data
US 2021/0332190 A1    Oct. 28, 2021

(51) Int. Cl.
*C08G 77/06* (2006.01)

(52) U.S. Cl.
CPC ................... *C08G 77/06* (2013.01)

(58) Field of Classification Search
CPC .................................................. C08G 77/06
See application file for complete search history.

(56) References Cited

U.S. PATENT DOCUMENTS 8,372,934 B2 * 2/2013 Staiger ............... C08G 77/06
528/10
2012/0202960 A1    8/2012 Staiger

FOREIGN PATENT DOCUMENTS

EP      2491071 B1    7/2014
WO   2011047973 A1    4/2011

* cited by examiner

*Primary Examiner* — Margaret G Moore
(74) *Attorney, Agent, or Firm* — Brooks Kushman P.C.

(57) ABSTRACT

Silicone resins are reproducibly prepared in a four step process in which alcohol recovered in a second step is recycled to the first step, and an aqueous phase recovered in the fourth step contains very little HCl, alcohol, or organopolysiloxane, and can be directed to waste treatment without any prior processing.

3 Claims, No Drawings

METHOD FOR PRODUCING ORGANOPOLYSILOXANE RESINS

CROSS REFERENCE TO RELATED APPLICATIONS

This application is the U.S. National Phase of PCT Appln. No. PCT/EP2017/061662 filed May 16, 2017, the disclosure of which is incorporated in its entirety by reference herein.

BACKGROUND OF THE INVENTION

1. Field of the Invention

The invention relates to a multistage process for preparing organopolysiloxane resins by hydrolysis and condensation of organochlorosilanes.

2. Description of the Related Art

Processes for preparing organopolysiloxane resins have already been known for a long time. Processes which react organochlorosilanes with water and alcohol are likewise known. In the prior art, for example, EP2491071B1 describes a cost-optimized process. The preparation takes place in three steps so as to better control the reactions, since an uncontrolled course of reaction leads rapidly to gelling of the reaction products, which are therefore unusable. The first step, a partial alkoxylation of the organochlorosilanes, takes place in this case continuously in an upright circulation reactor which, via a heating assembly on the ascending part of the tube reactor, regulates the temperature in the circulation reactor. As a result of this temperature regulation of the reaction it is possible, in spite of a greatly diminished quantity of ethanol, to produce silicone resins having identical end-product properties. In the second step, the continuously produced reaction product ("partial alkoxylate") from the first step is hydrolyzed discontinuously by addition of water in the presence of a water-immiscible solvent. Hydrochloric acid is formed in this procedure, and so, at the end of the operation, as well as the silicone resin solution, there is also an aqueous-alcoholic phase present, known as the "sour water", which consists of water, ethanol, and hydrochloric acid. This phase is separated off in the third step and passed on to a distillative ethanol recovery facility. The bottom product (water containing HCl) has to undergo wastewater processing, and so the HCl it contains is lost to the operation.

SUMMARY OF THE INVENTION

The object was therefore the provision of an improved process for preparing organopolysiloxane resins with a lower HCl loss, without altering the end-product properties. These and other objects are surprisingly achieved by the process of the invention, wherein organopolysiloxane resins are prepared by a process where,
in a first continuous step in an upright circulation reactor, having a heating assembly on the ascending part of the tube reactor which regulates the temperature in the circulation reactor, organochlorosilanes are reacted with 0.10 to 0.75 mol of water per mole of hydrolyzable chlorine and with 0.3 to 1.0 mol of alcohol per mole of hydrolyzable chlorine, where the molar ratio of water to alcohol is 0.10 to 2.5, where the ratio of hydrous alcohol to silane mixture is regulated within the stated boundaries such that the fraction of the alcohol phase in the product mixture of this first step is 0.1-50 wt %, where the temperature of the reaction medium is captured by the heating assembly to a temperature as regulated variable, compared with a fixed temperature in the range of 20-60° C. as a control variable, and with an accuracy of 5° C. in the sense of an alignment to the control variable, and the amount of alcohol used in this first step is reduced to an extent such that the fraction of alcohol phase in the overall product mixture of the first step is 0.1-40 wt %,
where the hydrous alcohol used may comprise up to 31 wt % of dissolved HCl and up to 5 wt % of water-insoluble organic solvents,
in a second step, to the reaction mixture obtained in the first step, water-insoluble organic solvent having a density of below 0.95 kg/l is added and water is metered in amounts of 1.5 to 5 mol of water per mole of Si component, and, after the end of the metered additions in the second step, the alcoholic HCl phase is separated, and
in a third step, to the siloxane phase of the second step, optionally water-insoluble organic solvent having a density of below 0.95 kg/l is added and water is metered in amounts of 5 to 200 mol of water per mole of Si component, and
in a fourth step, after the end of the addition of water in the third step, the aqueous phase formed is separated from the siloxane phase.

DETAILED DESCRIPTION OF THE PREFERRED EMBODIMENTS

The present invention thus pertains to a process, where in a first continuous step in an upright circulation reactor, having a heating assembly on the ascending part of the tube reactor which regulates the temperature in the circulation reactor, organochlorosilanes are reacted with 0.10 to 0.75 mol of water per mole of hydrolyzable chlorine and with 0.3 to 1.0 mol of alcohol per mole of hydrolyzable chlorine, where the molar ratio of water to alcohol is 0.10 to 2.5, where the ratio of hydrous alcohol to silane mixture is regulated within the stated boundaries such that the fraction of the alcohol phase in the product mixture of this first step is 0.1-50 wt %, where the temperature of the reaction medium is captured by the heating assembly to a temperature as regulated variable, compared with a fixed temperature in the range of 20-60° C. as a control variable, and with an accuracy of 5° C. in the sense of an alignment to the control variable, and the amount of alcohol used in this first step is reduced to an extent such that the fraction of alcohol phase in the overall product mixture of the first step is 0.1-40 wt %,
where the hydrous alcohol used may comprise up to 31 wt % of dissolved HCl and up to 5 wt % of water-insoluble organic solvents,
in a second step, to the reaction mixture obtained in the first step, water-insoluble organic solvent having a density of below 0.95 kg/l is added and water is metered in amounts of 1.5 to 5 mol of water per mole of Si component, and, after the end of the metered additions in the second step, the alcoholic HCl phase is separated, and
in a third step, to the siloxane phase of the second step, optionally water-insoluble organic solvent having a density of below 0.95 kg/l is added and water is metered in amounts of 5 to 200 mol of water per mole of Si component, and
in a fourth step, after the end of the addition of water in the third step, the aqueous phase formed is separated from the siloxane phase.

First Step: Continuous Partial Alkoxylation

The organochlorosilanes used in the first step of the process of the invention are preferably compounds of the general formula

$$R_aSiCl_{4-a} \quad (I),$$

where R may be identical or different and is a monovalent, SiC-bonded, substituted or unsubstituted hydrocarbon radical and a is 1, 2, 3.

Examples of unsubstituted radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals such as cyclopentyl, cyclohexyl, cycloheptyl and methylcyclohexyl radicals; aryl radicals such as the phenyl and the naphthyl radicals; alkaryl radicals such as the o-, m-, and p-tolyl radicals, xylyl radicals, and ethylphenyl radicals; aralkyl radicals such as the benzyl radical, and the α- and the β-phenylethyl radicals.

Examples of substituted radicals R are all radicals stated for R above which may be substituted preferably by mercapto groups, carboxyl groups, keto groups, aryloxy groups, acryloyloxy groups, methacryloyloxy groups, hydroxyl groups, and halogen groups.

Radical R preferably comprises hydrocarbon radicals having 1 to 8 carbon atoms, more preferably the methyl radical.

Examples of silanes of the formula (I) are methyltrichlorosilane, dimethyldichlorosilane, trimethylchlorosilane, isooctyltri-chlorosilane, phenyltrichlorosilane, diphenyldichlorosilane, and methylphenyldichlorosilane.

The silanes used in the process of the invention are preferably liquid at 20° C. and a pressure of 900 to 1100 hPa.

Mixtures of silanes of the formula (I) with at least one organotrichlorosilane are preferably used.

Within the boundaries of the present invention, hydrolyzable chlorine is intended to mean the chlorine which is present in the form of SiCl groups.

In the first step of the process of the invention, organochlorosilanes are mixed with preferably 0.002 to 0.75 mol, more preferably 0.1 to 0.5 mol, of water per mole of hydrolyzable chlorine.

In the first step of the process of the invention, organochlorosilanes are preferably mixed with 0.1 to 1.5 mol, more preferably 0.3 to 1.0 mol of alcohol per mole of hydrolyzable chlorine.

In the first step of the process of the invention, water is preferably used relative to alcohol in a molar ratio of 0.13 to 0.85.

In the process of the invention, the amount of alcohol used in the first step is preferably reduced to an extent such that the fraction of alcohol phase in the overall product mixture of the first step is preferably 0-50 wt %, 0.1-50 wt %, more preferably 0-40 wt %, 0.1-40 wt %, yet more preferably 0-25 wt %, 0.1-25 wt %, still more preferably 0-20 wt %, 0.1-20 wt %, and most preferably 0-10 wt %, 0.1-10 wt %.

Examples of alcohols which can be used in the first step of the process of the invention are all alcohols which are liquid at a temperature of 20° C. and under a pressure of 900 to 1100 hPa, such as methanol, ethanol, n-propanol, isopropanol, butanol, pentanol, hexanol, and heptanol. Methanol, ethanol, and butanol are preferred, and ethanol is particularly preferred.

If desired, further substances can be used as well in the first step of the process of the invention, in addition to organochlorosilanes, water, and alcohol (where the hydrous alcohol used here may contain up to 31 wt % of dissolved HCl and up to 5 wt % of water-insoluble organic solvents, preferably toluene). Examples of further substances used optionally are alkoxysilanes such as tetraethoxysilane, or water-insoluble organic solvents, preferably those solvents having a density of below 0.95 kg/l, such as toluene.

In the process of the invention, the molecular weight of the end product (organopolysiloxane resin) can be controlled through the reaction parameters of offgas pressure and reaction temperature in the first step of the preparation process (alkoxylation step). Through active regulation by way of the heating assembly, the temperature is kept constant, preferably in the range from 20 to 60° C., more preferably from 25 to 50° C., yet more preferably 25 to 45° C., and especially from 30-40° C. By means of compressors, the offgas pressure is preferably kept in the range of from 800 to 2000 hPa, more preferably 1000 to 1500 hPa, and most preferably 1100 to 1400 hPa. The accuracy of the temperature regulation may be set at ±5° C., preferably ±4.5° C., ±4° C., ±3.5° C., ±3° C., ±2.5° C., ±2° C., ±1.5° C., or ±1° C., most preferably ±0.5° C.

In the first step of the process of the invention, organochlorosilane or mixtures of organochlorosilanes are metered continuously into a circulation reactor equipped with heating assembly. At the same time, via a further feed line, a mixture of water and alcohol is metered continuously, with the water content of the alcohol being preferably in the range of 5-30 wt %, more preferably 8 to 28 wt %, and most preferably 10-25 wt %, and with the hydrous alcohol optionally comprising up to 31 wt % of dissolved HCl and up to 5 wt % of water-insoluble organic solvents, preferably toluene. Further substances may optionally be metered. In that case the products are alkoxysilanes, alkoxychlorosilanes and their hydrolysates and condensates, and also hydrogen chloride, alkyl chloride, and dialkyl ethers. Here, the hydrogen chloride gas obtained in the first step, after passing through suitable cleaning processes, can preferably be used again as a raw material in other processes, as for example with methanol to produce chloromethane, which is used in turn in the synthesis of methylchlorosilane. In this way the chlorine can be recycled without having to be released to the environment.

The first step is preferably carried out without introduction of mechanical energy, i.e., only with natural convection. The circulation reactor, also called a "loop reactor," is equipped with a heating assembly, and also, preferably, provided with a phase separation unit as well, with which any HCl-saturated alcohol phase formed can be returned to the circuit.

Second Step: Hydrolysis 1+Phase Separation I

Within the boundaries of the present invention, densities are based on a temperature of 20° C. at the pressure of the surrounding atmosphere, in other words 900 to 1100 hPa.

In the second step, the product of the first step is diluted with a water-insoluble organic solvent and preferably hydrolyzed with water in amounts of 1.5 to 5 mol of water per mole of Si component.

Within the boundaries of the present invention, water-insoluble organic solvents are intended to mean those solvents for which the solubility at 25° C. and at the pressure of the surrounding atmosphere, in other words 900 to 1100 hPa, is below 1 g solvent/100 g water.

Examples of preferred water-insoluble organic solvents which may be used in the process of the invention are saturated linear hydrocarbons such as n-pentane, n-hexane, n-heptane or n-octane, and also their branched isomers, and also aromatic hydrocarbons, such as benzene, toluene, and xylenes, and mixtures thereof. Toluene is preferably used.

The water-insoluble organic solvent used in the second step of the process of the invention is metered, preferably in amounts of 0.5 to 50 mol, more preferably 1 to 30 mol, based in each case on 1 mole of silicon component. The second step is preferably carried out in a batch reactor and with introduction of mechanical energy (e.g. stirring, circulatory pumping). The second step of the process of the invention is preferably carried out at a temperature of 0 to 100° C., more preferable 20 to 80° C., and preferably under a pressure of 500 to 2000 hPa, most preferably 600 to 1500 hPa.

It has emerged that an improvement in the phase separation can be achieved if additionally if alcohol is metered in. Preferably, 0.1 to 0.5 mol of alcohol (e.g., EtOH) is metered in, based in each case on 1 mole of silicon component. The alcohol may be added in a mixture with water or with the organic solvent, or may be added only after the end of the metering of water.

Third Step: Hydrolysis 2

In the third step, water is preferably metered in amounts of 5 to 200 mol of water per mole of Si component.

Optionally in the third step as well, the water-insoluble organic solvent can be added. This may be useful in order to achieve an improvement in the phase separation. Preferably water-insoluble organic solvents that are suitable for the third step of the process of the invention correspond in type and amount to those already disclosed under the second step.

The third step is preferably carried out in a batch reactor and with introduction of mechanical energy (e.g. stirring, circulatory pumping), preferably in the same reactor as the second step. The third step of the process of the invention is carried out at a temperature of 0 to 100° C., more preferably 20 to 80° C., and preferably under a pressure of 500 to 2000 hPa, more preferably 600 to 1500 hPa.

The hydrolysis and/or condensation reactions that proceed in the third step may be ended, in addition to the water dilution carried out, by any desired methods known to date, such as preferably, for example, neutralization with base such as sodium hydroxide solution.

Fourth Step: Phase Separation II

In the fourth step of the process of the invention, the solvent-containing siloxane phase is separated from the aqueous phase. This may be done by methods known to one skilled in the art, preferably such as leaving the reaction mixture to stand for 5 to 60 minutes until the phases have separated. The separated aqueous phase is passed on for wastewater processing.

Subsequently, from the siloxane-containing organic phase, in a fifth step (purification+concentration), the end product, a silicone resin solution of arbitrary concentration or a pure (undiluted) silicone resin, is produced.

This processing of the resultant organic siloxane phase is carried out, preferably according to any desired methods known in the prior art, such as, for example, neutralization, filtration, and removal of all volatile constituents, preferably by distillation. The volatile constituents preferably comprise low-boiling siloxanes and the water-insoluble organic solvent, preferably having a density of below 0.95 kg/l. Furthermore, for example, in the case of the siloxane phase, the concentration can be increased by removal of the solvent, for instance by distillation in a thin-film evaporator, and in this way organopolysiloxane resin solutions can be produced, or the solvent can be removed entirely to give solvent-free organopolysiloxane resins.

In accordance with the process of the invention it is possible to prepare reproducibly a large number of organopolysiloxane resins or solutions of defined properties, such as those resins or solutions, for example, that contain SiC-bonded radicals, hydroxyl radicals and/or alkoxy radicals.

The organopolysiloxane resins prepared in accordance with the invention may be solid or liquid at 20° C. under a pressure of 900 to 1100 hPa, and they preferably have an average molecular weight, measured against polystyrene standard, of up to 100,000 g/mol, more preferably 800 to 10,000 g/mol.

The organopolysiloxane resins prepared in accordance with the invention are preferably at least partly, but more preferably wholly, soluble in alkoxysilanes and their condensation products, and also in liquid siloxanes.

The organopolysiloxane resins prepared in accordance with the invention are preferably resins of the formula $$[RSiO_{3/2}]_g[R_2SiO]_b[R_3SiO_{1/2}]_c[SiO_{4/2}]_d[R^1O_{1/2}]_e[HO_{1/2}]_f$$

where R are methyl, isooctyl or phenyl radicals, $R^1$ are methyl, ethyl or butyl radicals, g=2-200, b=0-100, c=0-50, d=0-10, e=0-20, and f=0-10.

Examples of the organopolysiloxane resins prepared in accordance with the invention are $[MeSiO_{3/2}]_{72}[Me_2SiO]_{24}[EtO_{1/2}]_{2.8}[HO_{1/2}]_{0.4}$, $[MeSiO_{3/2}]_{12.2}[Me_2SiO]_{3.3}[Me_3SiO_{1/2}]_{1.4}[EtO_{1/2}]_{0.6}$ $[HO_{1/2}]_{0.18}$, $[MeSiO_{3/2}]_{15.3}[Me_2SiO]_{2.6}[Me_3SiO_{1/2}]_2[IO-SiO_{3/2}]_{0.8}[MeO_{1/2}]_2[HO_{1/2}]_{0.3}$, and $[PhSiO_{3/2}]_{9.8}[Me_2SiO]_2$ $[MeO_{1/2}]_{2.8}[BuO_{1/2}]_{0.04}[HO_{1/2}]_{0.18}$, where Me is the methyl radical, Et is the ethyl radical, IO is the isooctyl radical, Ph is the phenyl radical, and Bu is the butyl radical.

The organopolysiloxane resins prepared in accordance with the invention can be used for all purposes for which organopolysiloxane resins are useful, such as, for example, in architectural preservation, in the coatings sector, in cosmetic products, in the textiles sector and also paper. In particular they are suitable for producing emulsions, as binders for producing paints and varnishes, and as binders for producing mica-based electrical insulation materials.

A great advantage of the process of the invention is that it is substantially more economical for the alcoholic HCl phase separated off in the second step to be used again in step 1 without further treatment and therefore for the alcohol it comprises to be made available to the operation again without costly and inconvenient recovery beforehand. The HCl introduced in step 1 on this pathway leaves step 1 in the form of HCl gas and can consequently likewise be reused.

A further advantage is that the aqueous phase separated in the fourth step no longer contains any substantial quantity of HCl or alcohol, and so can be passed on for wastewater processing without substantial raw-material losses. By this means, as well, energy-intensive recovery of alcohol from the sour water is no longer necessary.

With the aid of the process of the invention, organopolysiloxane resins are obtained which exhibit high storage stability, are very low in chloride, have a low VOC content, and can be produced very cost-effectively.

Furthermore, the process has the advantage that it is possible to prepare organopolysiloxane resins that are solid at ambient temperature.

EXAMPLES

The following examples serve to illustrate the invention without limiting it.

In the examples described hereinafter, all data for parts and percentages are given by weight unless otherwise stated. Unless otherwise stated, the examples below are carried out under a pressure of the surrounding atmosphere, in other words approximately at 1000 hPa, and at room temperature, in other words at approximately 25° C., and/or at a temperature of which comes about when the reactants are brought together at room temperature without additional heating or cooling.

Comparative Example 1

Step 1: Partial Alkoxylation in Analogy to EP2491071B1

A methylchlorosilane mixture composed of 91 wt % methyltrichlorosilane and 9 wt % of dimethyldichlorosilane is reacted continuously as described in EP2491071B1 with a mixture of 81 wt % EtOH and 18 wt % water and 1 wt % toluene (impurity in the EtOH). (0.434 mol of EtOH per mole of SiCl and 0.243 mol of $H_2O$ per mole of SiCl; molar ratio $H_2O$/EtOH=0.56)

The ratio of EtOH-water mixture to methylchlorosilane mixture is 0.48. The reaction temperature is 31-32° C., the gauge pressure is 300-310 mbar, and the average residence time of the siloxane phase is 20-24 min. The reaction product in the form of the resultant liquid partial alkoxylate contains 18.5 wt % Cl in the form of dissolved hydrogen chloride and Si-bonded Cl. The EtOH content, in the form of free EtOH and in the form of Si-bonded EtO groups, was 41 wt %.

74.5 wt % of the chlorine present in the chlorosilane mixture leaves process step 1 in the form of hydrogen chloride gas.

The partial alkoxylate recovered has a density of 1.075 $g/cm^3$ (25° C.).

Step 2: Hydrolysis 1

A mixture of 245 g of partial alkoxylate in step 1 and 350 g of toluene (3.8 mol) is introduced initially, and 61.4 g of water (3.4 mol) is metered with stirring over the course of 35 min. During this procedure, the temperature of the mixture rose from 25 to 54° C.

After the end of the addition of water, stirring was continued for 30 min more. After that, 294.1 g of water (16.3 mol) are metered to this mixture rapidly, over the course of 5 min, with vigorous stirring.

Step 3: Phase Separation

After a waiting time of one hour, the lower, aqueous phase=sour water (468.5 g) with an HCl content of 9.4 wt % (abs. 44 g of HCl) is separated off. (Composition by GC: 68.9 wt % water; 20.94 wt % EtOH, 0.05 wt % toluene) (The HCl content ascertained by titration was taken into account when evaluating the GC).

The sour water is distilled to recover the ethanol. EtOH is obtained as an overhead product. The HCl present passes along with the bottom product into the wastewater, and is therefore lost.

Step 4: Purification+Concentration

The remaining 472.4 g of toluenic resin solution, with a 60.1 wt % toluene content, are admixed and stirred with a mixture of activated carbon, Dicalite and $NaHCO_3$, and the solids are filtered off again.

The resin solution purified in this way is subsequently freed from low-boiling constituents at 175° C. down to an eventual vacuum of 10 mbar.

This gave 115.2 g of viscous resin (for analytical data, see table 1) and 318.4 g of distillate with a toluene content of more than 90 wt %.

Inventive Example 1

Step 1: Partial Alkoxylation Takes Place in Analogy to Comparative Example 1

Step 2: Hydrolysis 1+Phase Separation I

A mixture of 246 g of partial alkoxylate from step 1 and 350 g of toluene (3.8 mol) is introduced initially and a mixture of 73.6 g of water (4 mol) and 14.7 g (0.32 mol) of EtOH is metered with stirring over the course of 34 min (16.6 wt % EtOH in water). The temperature of the mixture rose from 25 to 55° C.

After the end of the metering, stirring is continued for 30 min and, after a waiting time of 1 h, the lower, ethanolic HCl phase is separated off. This gave 213.5 g of ethanol phase with a titrated HCl content of 20.2 wt % (43.13 g of HCl). (Composition based on NMR: about 20 wt % HCl, 50 wt % EtOH and about 26 wt % water; <4 wt % toluene)

This mixture can be used again in step 1 for the partial alkoxylation.

Step 3: Hydrolysis 2

281.7 g of water (15.6 mol) are metered over the course of 5 min with vigorous stirring to the toluenic siloxane phase formed in step 2.

Step 4: Phase Separation II

After a waiting time of one hour, the lower, aqueous phase (279.1 g with an HCl content of 0.21 wt % (abs. ~0.6 g of HCl) is separated off. (Composition by GC: 98.1 wt % water; 1.82 wt % EtOH, 0.02 wt % toluene)

The aqueous phase contains only a little HCl, ethanol, toluene and Sx (silicone), and can be delivered as process wastewater to the wastewater processing plant.

Step 5: Purification+Concentration

The remaining 464.5 g of toluenic Sx phase, with a 65.5 wt % toluene content (34.5% Sx compounds), are admixed with a mixture of activated carbon, Decalite Dicalite and $NaHCO_3$, and stirred, and the solids are therefore filtered off again and disposed of. The resin solution purified in this way is subsequently freed from low-boiling constituents (primarily toluene) at 175° C. down to an eventual vacuum of 10 mbar.

This gave 112.3 g of viscous resin and 297 g of distillate. The toluene content of the distillate is more than 90 wt %, and it can be used again in step 2.

Table 1 below shows the analytical data for the product from inventive example 1 as compared with the product from comparative example 1.

TABLE 1

|  | Inventive example 1 | Comparative example 1 |
|---|---|---|
| Yield 100% resin [g] | 112 | 115 |
| Viscosity (80° C.) [mPa * s] | 14,000 | 28,650 |
| Viscosity of a 50 wt % solution in toluene [$mm^2$/s] | 12 | 18 |
| Total chlorine content [ppm] | <3 | <3 |
| HCl titration [ppm] | 2.6 | 0.2 |
| Mw [g/mol] | 7500 | 7700 |
| Mn [g/mol] | 1650 | 1800 |
| Polydispersity (Mw/Mn) | 4 | 4 |

TABLE 1-continued

|  | Inventive example 1 | Comparative example 1 |
|---|---|---|
| [Me2SiO2/2] wt [%] (29Si-NMR) | 11 | 11 |
| [MeSiO3/2] wt [%] (29Si-NMR) | 83 | 84 |
| Si—O1/2Et wt [%] (29Si-NMR) | 4.9 | 4.4 |
| Si—OH wt [%] (29Si-NMR) | 0.71 | 0.73 |

The invention claimed is:

1. A process for preparing organopolysiloxane resins, comprising:

in a first continuous step, reacting organochlorosilanes in an upright circulation tube reactor which, via a heating assembly on an ascending part of the tube reactor regulates the temperature in the circulation tube reactor, with an aqueous alcohol comprising 0.10 to 0.75 mol of water per mole of hydrolyzable chlorine and 0.3 to 1.0 mol of alcohol per mole of hydrolyzable chlorine, where the molar ratio of water to alcohol is 0.10 to 2.5, and withdrawing a product mixture from the reactor, wherein the ratios of water and alcohol of the aqueous alcohol to organochlorosilanes is regulated within the previous limits such that the fraction of the aqueous alcohol phase in the product mixture is from 0.1-50 wt %, and wherein the temperature of the reaction medium is provided to the heating assembly as a regulated variable, compared with a fixed temperature in the range of 20-60° C. as a control variable, and is regulated with an accuracy of ±5° C. with respect to the fixed temperature of the control variable, and wherein the aqueous alcohol used optionally comprises up to 31 wt % of dissolved HCl and up to 5 wt % of water-insoluble organic solvents;

in a second step, adding to the reaction mixture obtained in the first step, water-insoluble organic solvent having a density of below 0.95 kg/l and metering in water in amounts of 1.5 to 5 mol of water and 0.1 to 0.5 mol of alcohol per mole of organochlorosilane, and, after the end of the metered additions in the second step, separating an alcoholic HCl phase from a siloxane phase;

in a third step, metering in water in amounts of 5 to 200 mol of water per mole of organochlorosilane to the siloxane phase of the second step, and optionally adding water-insoluble organic solvent having a density of below 0.95 kg/l; and in a fourth step, after the end of the metering of water in the third step, separating an aqueous phase from the siloxane phase.

2. The process of claim 1, wherein in the second step, water-insoluble organic solvent is metered in amounts of 0.5 to 50 mol, based on 1 mole of Si component.

3. The process of claim 1, wherein in the second step, water-insoluble organic solvent is metered in amounts of 1 to 30 mol, based on 1 mole of organochlorosilane.

* * * * *